United States Patent Office 3,060,042
Patented Oct. 23, 1962

3,060,042
PRODUCTION OF DEAD BURNED GRAIN
Earl Leatham, Wexford, and Albert H. Pack, Pittsburgh, Pa., assignors to Harbison-Walker Refractories Company, Pittsburgh, Pa., a corporation of Pennsylvania
No Drawing. Filed July 1, 1960, Ser. No. 40,181
18 Claims. (Cl. 106—58)

This invention relates to the production of dead burned dolomite, dead burned lime, dead burned mixtures of dolomite and lime, and dead burned mixtures of any of the foregoing with free magnesia, in which the resulting products are of very high density, of high purity, and show good resistance to hydration. In particularity, the invention is concerned with the production of the foregoing materials for use as refractory materials.

For many years, there have been repeated attempts and many proposals to make use of dolomite and lime as refractory materials. The extremely high melting point of those substances make them very appealing for such purposes, and widespread occurrence make them practical economically. The fact is, however, that commercial success in producing dolomite and lime refractory shapes has been very limited; this is mainly due to their great affinity for moisture, i.e., they hydrate readily with consequent complete breakdown of the bodies into powder. Also, as commonly produced, their density at high purities has been too low for desired uses. Lime particularly has been subject to hydration to a greater degree than dolomite.

Much research has been carried on through the years to discover a means for stabilizing burned lime and dolomite against attack by moisture while retaining their extremely high refractoriness. Numerous chemical additives have been tried but when enough of the chemical had been added to stabilize either of them, the original desirable refractory properties of each were no longer present. Coating the grains and the shaped bodies with oils has also been practiced, but, of course, the cure here is only temporary.

High purity dolomite and lime, after calcination, also normally do not have the high density, and consequent low porosity, desired by the manufacturer and user of refractories. Thus, impurities, e.g., iron oxide, are considered advantageous in the dead burned grain. Although iron oxide acts as a densifying agent, its presence has a deleterious effect on the ability of dolomite and lime to resist the corrosive condition present in, say, a steel making furnace. Therefore, there has been an apparent need for a dense, high purity dolomite or lime grain that would be resistant to hydration.

For certain applications, it has been found desirable to produce brick composed of varying percentages of lime and magnesia. These brick have proved effective where resistance to slags occurring in steel making processes is of paramount importance. The slags present in the open hearth or oxygen converter are of a complex character, and the reactions between these slags and the brick linings are manifold and far from completely understood. Brick of a varying composition of magnesia and lime have been successfully tested in these applications. Brick of high purity magnesia have shown good resistance to attack by the slags and fumes normally encountered. Nevertheless, it has been found that the presence of some lime in these bodies inhibits the penetration of slag, and thereby further retards the corrosion of the brick.

Brick of this type have heretofore been produced from grains of high purity magnesia and lime or dolomite, which are sized and blended in proportions to yield the desired final composition. The mix is then moulded into brick or other shapes. Since strength, resistance to corrosion and refractoriness are improved with increased density, it is evident that such products can be improved and their usefulness enhanced by forming them from mixes of materials that are extremely dense.

It is, therefore, a primary object of this invention to provide a method of producing dead burned lime, dead burned dolomite, dead burned mixtures of lime and dolomite and dead burned mixtures of magnesia and any of the foregoing, of high purity, high density, and resistance to hydration that is simple, inexpensive, easily practiced with standard equipment, and results in dead burned grain adapted for use in making refractories for high temperature uses.

Other objects will appear from the following specification.

It is well known in the refractory art that strength, resistance to corrosion, and refractoriness of a body are improved with increased density. The present invention provides a method for producing an extremely dense grain of the compositions demanded for selected very high temperature service applications.

Briefly, in accordance with the present invention, high purity calcined dolomite, calcined lime, mixtures of calcined lime and calcined dolomite, or mixtures of caustic calcined magnesia and any of the foregoing are briquetted without water or binders under extremely high pressure, and the resulting briquettes are fed into a firing chamber where they are dead burned at high temperatures. The combination of these steps results in such an increase of the density of the grain, over prior practices, as to yield as a final result dead burned dolomite grain of about 3.25 grams per cubic centimeter, dead burned lime grain of about 3.1 grams per cubic centimeter and dead burned MgO—CaO grain ranging from about 3.25 to 3.35 grams per cubic centimeter depending upon the composition of the product. The maximum density of dolomite is about 3.46 and that of lime about 3.34. Accordingly, it is evident that the invention provides grain approaching ideal density.

We have found that the briquetting step under very high pressure is essential and critical in producing grain of maximum density, approaching theoretical, as there is a limit to the amount of densification that can be accomplished in the mere burning of these materials. We have also found that an extremely high dead burning temperature is essential to the production of briquettes possessing the density and hydration resistance desired and which characterize the invention. Thus, temperatures of at least 3400° F. are required and up to 4200° F. and even higher are necessary to dead burn the briquetted calcined materials to maximum density and resistance to hydration. The higher temperatures of 4000° to 4200° or 4300° F. are generally used with compositions having a substantial magnesia content.

In carrying out our process, calcined dolomite or lime, or mixtures of them, of very high purity are used. As to materials, limestone is the source of the lime in the practice of the invention. The limestone is to be of such purity that when calcined the CaO will be at least about 95 percent, and preferably higher, to obtained the high density desired. As to dolomite, essentially pure dolomites, i.e., $CaCO_3 \cdot MgCO_3$, are available that are very low in impurities, and such rocks with not over about 1, or at most 2, percent impurities are necessary in the practice of the invention. Such purities are exemplified by the following examples.

The limestone and raw dolomite are calcined at a temperature to convert them to calcined products with not over about 2 percent, preferably not over 1 percent, ignition loss. Generally, this is accomplished at temperatures from, say, 1600° to 2200° F.

The caustic calcined magnesia of high purity used in the invention is generally the result of calcining magnesium hydroxide precipitated from seawater or other brines, and normally analyzing at least 95 percent MgO. A suitable calcine can be achieved by calcining in a multiple hearth roaster at 1700° to 2200° F., but any method of burning at those temperatures can be adopted, as long as a product having an ignition loss of not over 1.0 percent is obtained.

The calcines or their progenitor ores may be crushed or ground to desired particle size, depending on, for instance, their character and the calcining conditions, for the dead burned compresses, or briquettes, must be crushed and grain sized in any event to prepare the final refractory shapes or mixes made from them.

The calcined materials, or mixtures of them, are dry pressed or compacted into shapes by briquetting rolls, under extremely high pressure, for example to yield almond-shaped briquettes about 1.5" long, ¾" wide, and ⅝" thick. No water, temporary or chemical bond is used for these briquettes. The absence of water is, of course, particularly desirable where, as here, the materials are normally extremely prone to hydration which can cause swelling. Pressures of at least 20,000 p.s.i., and preferably higher, are necessary in order to insure high density grain of the final product. Further densification may be achieved by subjecting the compressed bodies to at least one further pressing operation, under similar pressures. However, a single pass through the briquetting rolls has been found to give a body having a density of about 2.0 grams/cc. and of such strength that very few broken chips result. These chips are normally screened off and are recycled to the feed to the briquetting rolls in the interest of economy. This briquetting is normally carried out at room temperature although pressing at elevated temperatures, such as up to 600° F. and higher, has proved very satisfactory. The pressing at elevated temperatures is thought to remove any water mechanically retained by the material thus giving a somewhat denser briquette. Moreover, hot pressing seems to provide a stronger briquette, and therefore would be used to achieve the highest density and strength.

The briquettes are passed to a firing chamber, e.g., a rotary or vertical kiln, where they are dead burned at very high temperatures, suitably at temperatures over 3400° F.

The following are examples of our process.

*Example I*

Calcined dolomite, analyzing about 99 percent CaO.MgO on an ignition-free basis and all passing a 10-mesh Tyler screen, was fed to briquetting rolls which produced almond-shaped briquettes measuring about 1.5 x ¾ x ⅝". The material was fed to the press at room temperature. A pressure of 30,000 p.s.i. was exerted on the rolls and briquettes having a density of 2.0 grams/cc. were produced. No bonding agent, water or pressing aid was added to the material, yet the bodies produced were of such strength that breakage and dusting were extremely limited. The number of fines and chips recovered after screening was so small that they were not recirculated to the feed to the briquetting rolls, although for reasons of economy this can be done.

The briquettes were then conveyed to a vertical kiln operated at temperatures ranging from 3500° to 4000° F. in the burning zone. The total time the briquettes were in the kiln was about two hours, about one-half hour of which was spent in the firing zone. When discharged, the briquettes had shrunk to a bulk density of 3.25 grams/cc. and a porosity of about 6 percent.

These briquettes were not only of high density but exhibited a good degree of hydration resistance. One explanation for this property is believed to be that the extremely high density accompanied by very low porosity, limits the number of points at which hydration can begin. It has been found that these briquettes can be stored for periods of over two months with no special protection.

*Example II*

Calcined lime, analyzing about 96 percent CaO on an ignition-free basis, and all finer than ½ inch, was given the same treatment as that described above in Example I. Briquettes having a density of about 1.8 grams/cc. were produced by a single pass through the briquetting rolls operating under 30,000 p.s.i. Burning these briquettes at between 3700° F. and 4000° F. resulted in a bulk density of about 3.1 grams/cc. and a porosity of about 7 percent. These bodies also showed remarkable resistance to hydration in that they have been stored for as long as one month with no special protection.

*Example III*

Calcined lime, analyzing about 96 percent CaO on an ignition-free basis and all finer than ½ inch, was blended in an amount about 10 percent by weight with caustic calcined magnesia produced in a multiple hearth calciner, analyzing about 96 percent MgO on an ignition-free basis and all passing a 65 mesh Tyler screen. This mix was fed at room temperature to briquetting rolls which produced almond-shaped briquettes, averaging about 1.5 x ¾ x ⅝ inches. The briquetting rolls were operated under a pressure of 30,000 p.s.i. and briquettes having a density of about 2.0 grams/cc. were produced after a single pass through the rolls. No water, chemical bonding agent, or pressing aid was incorporated in the mix, yet the bodies were of such strength that breakage and dusting were practically non-existent.

The briquettes were conveyed to a burning chamber which in this case was a vertical kiln. The kiln was operated at temperatures ranging from 3500° to 4200° F. in the burning zone. The briquettes were in the kiln for about two hours, about one-half hour of which was spent in the firing zone. When discharged, the briquettes had shrunk to a bulk density of 3.30 grams/cc. and had a porosity of about 6 percent.

*Example IV*

Calcined dolomite, analyzing about 99 percent CaO.MgO on an ignition-free basis and all passing a 10 mesh Tyler screen, was mixed in an amount about 50 percent by weight with caustic calcined magnesia analyzing about 96 percent MgO on an ignition-free basis and all passing a 65 mesh Tyler screen. A grain of about 70 percent MgO and 30 percent CaO was desired. This mix was given the same treatment as that described in Example III. Briquettes having a density of about 2.0 grams/cc. were produced after a single pass through the rolls operating under 40,000 p.s.i. Briquettes having a bulk density of 3.25 and a porosity of about 6 percent resulted from burning between 3500° to 4000° F.

Examples III and IV show that high purity grain of compositions of magnesia and lime, in which the magnesia forms the major component, can be manufactured through our process which exhibits the high density so necessary in the production of refractories. We have found that the high density, with consequent low porosity, of these briquettes appears to lend resistance to hydration to the bodies. The explanation for this increased resistance to hydration is not fully understood, but as stated above, it is believed that the high density, accompanied by very low porosity, limits the number of points at which hydration can begin. These magnesia containing briquettes have been stored without deleterious effect for periods of over four months with no special protection.

From the foregoing data and discussion, it is evident that the present invention constitutes a unique and effective manner of providing very dense CaO or MgO.CaO grain of particular usefulness in the refractory arts. The composition of the grain can range from essentially CaO to mixed compositions of MgO.CaO, have a CaO content from 5 weight percent upwardly and a magnesia content of up to 95 weight percent. Where mixed compositions are produced as by adding magnesia to lime or dolomite and producing grain as in this invention, it is preferred that the MgO analysis of the final product exceed about 50 weight percent and preferably is at least 60 to 65 weight percent of the total. It may be noted that the grain obtained upon use of mixtures of magnesia and lime or dolomite, result in substantially homogeneous grain, and such materials are of greater usefulness in preparing brick or other shapes, than is a mere mechanical mixture of the same analysis.

While the briquetting and burning steps of the invention as set forth hereinbefore are of critical significance in obtaining the dense grain with low porosity, some modification can be made in some of the other steps. For example, in place of providing raw materials for the briquetting rolls, we have found that a mixture of caustic calcined dolomite or limestone with wet magnesium hydroxide can be treated in a hearth-type calcining furnace to provide the requisite calcine of each. The product is obtained intimately admixed. Where it is desired to avoid a double burning to obtain the lime or dolomite caustic calcine, an admixture of crude limestone or dolomite with magnesium hydroxide can be made and subjected to caustic calcining conditions in a hearth furnace.

It will be understood that grain of compositions other than those of the examples can readily be produced by our invention. The burning of the briquettes at the high temperatures employed gives a homogeneous grain, thereby assuring uniformity of composition throughout the brick produced therefrom.

The chemical analyses of the lime, dolomite, and magnesia used in the foregoing examples were:

|  | Dolomite, percent | Lime, percent | Magnesia, percent |
|---|---|---|---|
| $SiO_2$ | 0.14 | 1.59 | 1.6 |
| $Al_2O_3$ | 0.25 | 0.80 | 0.5 |
| $Fe_2O_3$ | 0.09 | 0.26 | 0.5 |
| CaO | 57.45 | 95.70 | 1.1 |
| MgO | 41.54 | 0.91 | 96.3 |
| Ign. Loss | 0.51 | 0.70 |  |

This application is a continuation-in-part of our copending application, Serial No. 7,767, filed February 10, 1960, now abandoned.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method comprising the steps of dry forming into small compressed bodies under a pressure of at least 20,000 p.s.i. a composition free from water containing about 5 to 100 percent CaO and the remainder MgO, where the components of said composition are selected from the group consisting of high purity calcined lime, high purity calcined dolomite, and caustic calcined magnesia, and passing the said bodies to a furnace and heating them to a temperature of at least 3400° F. to produce a dead burned product of high density.

2. That method comprising the steps of dry forming into small compressed bodies under a pressure of at least 20,000 p.s.i. a water-free composition consisting essentially of caustic calcined magnesia and at least one calcined member of the group consisting of high purity lime and high purity dolomite, and passing the said bodies to a furnace and heating them to a temperature of at least 3400° F. to produce a dead burned product of high density.

3. A method in accordance with claim 2 said materials in said mixture being calcined to an ignition loss not over about 2 percent.

4. A method according to claim 3 said bodies being heated at a temperature of about 3400° to 4200° F.

5. That method comprising the steps of calcining a mixture consisting essentially of magnesium hydroxide and at least one high purity material of the group consisting of dolomite and limestone at a temperature of about 1600° to 2200° F., forming the dry calcined material in the absence of water into small compressed bodies under a pressure of at least 20,000 p.s.i., and passing the compressed bodies to a kiln and heating them to a temperature of about 3400° to 4200° F. and thereby converting the compressed material to a dead burned condition of high density.

6. A method according to claim 5, said composition being a mixture of dolomite and magnesia and said magnesia content being sufficient to provide an MgO content of the resulting grain of at least 50 weight percent.

7. That method comprising the steps of calcining a mixture consisting essentially of magnesium hydroxide and at least one high purity material of the group consisting of dolomite and limestone at a temperature of about 1600° to 2200° F. to an ignition loss of not over about 2 percent, forming the dry calcined material in the absence of water into small compressed bodies under a pressure of at least 20,000 p.s.i., repressing the bodies at least once under said pressure, and passing the compressed bodies to a rotary kiln and heating them to a temperature of about 3400° to 4200° F. and thereby converting the compressed material to a dead burned condition of high density.

8. That method comprising the steps of dry forming at least one calcined member of the group consisting of high purity lime and high purity dolomite, in the absence of water, into small compressed bodies under a pressure of at least 20,000 p.s.i., and passing the said bodies to a furnace and heating them to a temperature of at least 3400° F. to produce a dead burned product of high density.

9. A method according to claim 8, said material being calcined to an ignition loss not over about 2 percent.

10. A method according to claim 9, said bodies being heated at about 3400° to 4000° F.

11. A method according to claim 10, said lime being of at least about 95 percent purity, and said dolomite being essentially $CaCo_3.MgCo_3$.

12. A method according to claim 8, said bodies before passing to said furnace being re-pressed at least once under said pressure.

13. That method comprising the steps of calcining at least one high purity material of the group consisting of dolomite and limestone at a temperature of about 1600° to 2200° F., forming the dry calcined material in the absence of water into small compressed bodies under a pressure of at least 20,000 p.s.i., and passing the compressed bodies to a kiln and heating them to a temperature of about 3400° to 4000° F. and thereby converting the compressed material to a dead burned condition of high density.

14. A method according to claim 13, said limestone containing at least about 95 percent of CaO, and said dolomite being essentially $CaCo_3.MgCo_3$.

15. A method according to claim 14, the calcined material being a mixture of calcined limestone and dolomite.

16. That method comprising the steps of calcining at least one high purity material of the group consisting of dolomite and limestone at a temperature of about 1600° to 2200° F. to an ignition loss not over about 2 percent, forming the dry calcined material in the absence of water into small compressed bodies under a pressure of at least 20,000 p.s.i., repressing the bodies at least once under said pressure, and passing the compressed bodies to a rotary kiln and heating them to a temperature of about 3400° to 4000° F. and thereby converting the compressed material to a dead burned condition of high density.

17. A method according to claim 16, said calcined material being at a temperature of at least about 600° F. when being compressed.

18. That method comprising the steps of calcining at least one high purity material of the group consisting of dolomite and limestone to an ignition loss not over about 2 percent, forming the dry calcined material in the absence of water into small compressed bodies under a pressure of at least 20,000 p.s.i., repressing the bodies at least once under said pressure, recycling for compression at least a portion of any broken parts of said bodies, and passing the compressed bodies to a rotary kiln and heating them to a temperature of about 3400° to 4000° F. and thereby converting the compressed material to a dead burned condition of high density.

References Cited in the file of this patent

UNITED STATES PATENTS

| | | |
|---|---|---|
| 2,640,759 | Hughey | June 2, 1953 |
| 2,678,887 | Hathaway | May 18, 1954 |
| 2,876,122 | Whittemore | Mar. 3, 1959 |